United States Patent [19]

Richter

[11] Patent Number: 4,578,626
[45] Date of Patent: Mar. 25, 1986

[54] ELECTRICAL CONTROL ARRANGEMENT FOR A ROLLING MILL DRIVE MOTOR OF A ROLLING MILL

[75] Inventor: Walter Richter, Erlangen, Fed. Rep. of Germany

[73] Assignee: Siemens Aktiengesellschaft, Berlin and Munich, Fed. Rep. of Germany

[21] Appl. No.: 714,344

[22] Filed: Mar. 21, 1985

Related U.S. Application Data

[63] Continuation of Ser. No. 572,825, Jan. 23, 1984, abandoned.

[30] Foreign Application Priority Data

Jan. 24, 1983 [DE] Fed. Rep. of Germany ....... 3302222

[51] Int. Cl.⁴ .......................... H02P 5/16; H02P 7/00
[52] U.S. Cl. .................... 318/338; 318/432; 318/317; 318/327
[58] Field of Search ............... 318/6, 143, 309, 310, 318/317, 326, 329, 332, 338, 339, 341, 344, 345 C, 345 G, 432, 438, 493, 494, 599, 314, 327

[56] References Cited

U.S. PATENT DOCUMENTS

| | | | |
|---|---|---|---|
| 3,735,225 | 5/1973 | Raatz | 318/327 X |
| 3,902,109 | 8/1975 | Speth et al. | 318/341 X |
| 3,947,737 | 3/1976 | Kimura et al. | 318/314 X |
| 3,950,684 | 4/1976 | Peterson | 318/338 |
| 3,965,403 | 6/1976 | Okado | 318/143 |
| 4,019,107 | 4/1977 | Dixon et al. | 318/493 X |
| 4,090,119 | 5/1978 | Griffith et al. | 318/432 |
| 4,119,897 | 10/1978 | Skoog | 318/327 X |
| 4,230,975 | 10/1980 | Donatelli et al. | 318/6 |
| 4,240,015 | 12/1980 | White | 318/338 |
| 4,305,026 | 12/1981 | Kobari et al. | 318/327 X |
| 4,464,620 | 8/1984 | Schwager et al. | 318/345 G X |
| 4,498,036 | 2/1985 | Salemka | 318/599 X |

Primary Examiner—William M. Shoop, Jr.
Assistant Examiner—Shik Luen Paul Ip
Attorney, Agent, or Firm—Kenyon & Kenyon

[57] ABSTRACT

An electric control arrangement for controlling the speed of a roll driving motor for rolling mills for manufacturing hollow blocks is described. A power controller determines from the speed, field strength and armature current of the driving motor, the actual value of the motor power, compares the latter with a reference value, and generates a controlled variable which is fed to a current controller of the control arrangement to control the motor so that the motor delivers constant power.

5 Claims, 1 Drawing Figure

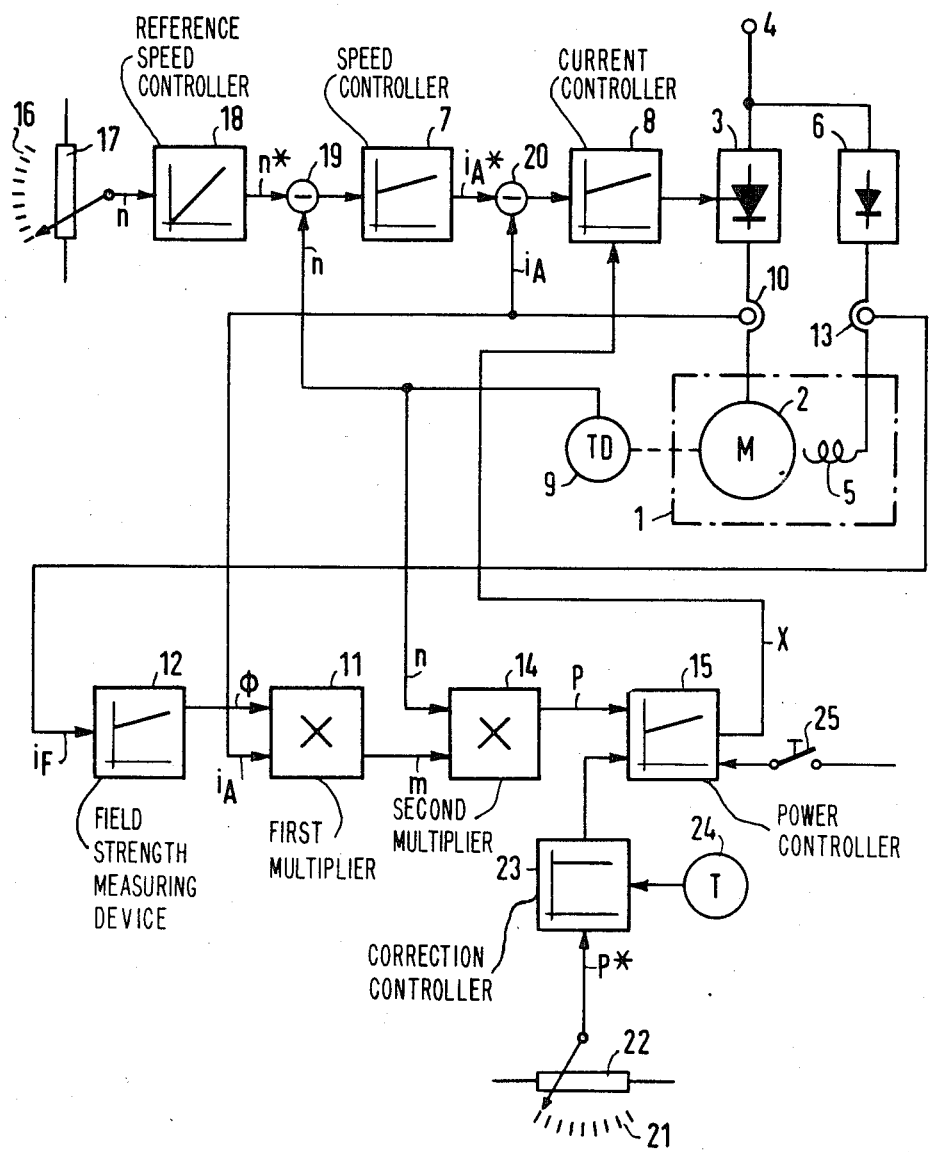

ELECTRICAL CONTROL ARRANGEMENT FOR A ROLLING MILL DRIVE MOTOR OF A ROLLING MILL

This application is a continuation of application Ser. No. 572,825, filed Jan. 23, 1984, now abandoned.

BACKGROUND OF THE INVENTION

The present invention relates to an electric control arrangement for the speed control of a rolling mill drive motor of a rolling mill for producing hollow blocks, such as is known in principle in rolling mill technology from DE-OS No. 23 26 115.

Such hollow blocks, also known in the industry as blooms, are the basic material for a subsequent rolling process which stretches the hollow block into a finished or semifinished tube. For producing such a hollow block, a steel block is rolled over a mandrel by means of the so-called diagonal rolling process or Mannesmann process. The diagonal rolling process is a hot rolling process in which a hot steel block is set in rotary motion with axial feed between mutually inclined rolls having the same direction of rotation. The block is held between the rolls by means of guide rolls, for example. Approximately in the central axis of this system, a mandrel is arranged which extends with its tip into the rolling gap approximately to one-half the roll length. In this manner the block is rolled over the mandrel in the course of the rolling process so that at the end, a hollow block or cylinder is produced which serves as the starting material for the subsequent tube rolling. A disadvantage of this process is that radial cracks are produced when the cavity is formed in front of the tip of the mandrel. If the cracks exceed a certain extent, the bloom must be scrapped. With fixed nominal speed values, the crack formation can assume an unpermissible extent if the material properties are changed due to temperature, a change of charges or other inhomogeneities.

SUMMARY OF THE INVENTION

It is an object of the present invention to automatically counteract this material-dependent crack formation by providing apparatus for influencing the electric control arrangement for the rolling mill drive motor.

It has been discovered that the roll torque and roll speed are those quantities which exert a direct influence on the degree of crack formation.

The above and other objects of the present invention are achieved in a control arrangement having a speed controller and an armature current controller for the rolling mill drive motor wherein a power controller determines from the speed, field strength and armature current of the drive motor the actual value of the motor power, compares the latter with a reference value and forms a regulated quantity which acts on the current controller in order to control the armature current so that the motor delivers constant power. A control arrangement is thus provided which takes into consideration the nature of the material to reduce the above-described crack formation. By introducing a power quantity influencing the speed and the torque of the motor, the control arrangement can be realized without major additional costs.

In a further embodiment of the invention, a reference value setter is coupled to the power controller which makes possible a correction of the desired power value as a function of the type of material to be rolled. In this manner a further factor influencing the degree of crack formation, namely, the kind of starting material, can be accounted for by the control arrangement.

BRIEF DESCRIPTION OF THE DRAWING

The invention will be described in greater detail in the following detailed description with reference to the single drawing FIGURE which is a block diagram of one embodiment of the control arrangement according to the invention.

DETAILED DESCRIPTION

With reference now to the drawing FIGURE, the control arrangement is shown schematically in its basic form. The roll drive motor 1 has an armature winding 2 connected to a supply network 4 via a thyristor rectifier 3, and a field winding 5, likewise supplied from network 4, via a rectifier 6. The control arrangement comprises a speed controller 7, current controller 8 for controlling the armature current of motor 1 coupled thereto, current transformer 10 for measuring the actual armature current of motor 1, tachometer generator 9 for measuring the actual speed $n_{ist}$ of motor 1 and current transformer 13 for measuring the field current $I_F$ of motor 1. These components of the control arrangement serve in a known manner for keeping the motor speed constant independently of the material to be rolled and other rolling conditions. Keeping the roll speed constant, however is not always an advantage in rolling mills, as described above.

Through the additional control elements described in the following, the invention describes a control arrangement by which material tolerances can be taken into consideration in an automatic control system.

In order to explain the operation of the invention, we start with the formulated relation $P = m \times n$: and $m = i_A \times \phi$, where P = motor power
m = motor torque
n = motor speed
$i_A$ = armature current of the motor
$\phi$ = field strength of the motor.

From the above equations, it can be observed that in case of a larger demanded torque, perhaps due to a relatively tough material, and if the speed is kept constant, the motor power must be increased proportionally. If, however, the control arrangement is operated in such a manner that the power and not the speed is kept constant, a correspondingly linear reduction of the speed results therefrom.

According to the invention, it has been found that such a measure is surprisingly well suited to adapt the speed to the properties of the material being rolled, for instance, the toughness of the base material, in such a way that crack formation is not increased. In order to achieve the objects of the invention, a power controller is associated with the speed controller 7. This power controller comprises multiplier 11 for determining the torque m due to the armature current $i_A$, a field strength measuring device 12 for determining the magnitude of the field strength from the magnitude of the field current $i_F$ measured by means of the current transformer 13, a further multiplier 14 for determining the actual power of the motor from the quantity for the torque m determined by the multiplier 11 and the value determined by the tachometer generator 9 for the actual speed and controller 15 which forms from the actual power value determined by the multiplier 14 and a desired or reference power value, a quantity X for the speed correction. The quantity for the speed correction is fed to current controller 8, in the sense of a speed-quantity corrected in accordance with the desired power.

To explain the operation of the control arrangement, the basic quantity for the desired speed n* is preselected at the setting scale 16 of a potentiometer 17. This quantity is fed to a controller 18 which has the purpose of controlling the desired speed reference value upward in accordance with a preselected function.

The corrected speed reference value generated by controller 18 is fed to a subtraction stage 19 which determines from this reference value and the actual value of the speed furnished by the tachometer generator 9 a difference value which is fed to the speed controller 7 as an input quantity. The latter contains a stage which determines from the input quantity a controlled quantity corresponding to the desired value for the armature current $i_A^*$ of the motor. The latter is fed to a further subtraction stage 20 which forms from the last-mentioned value and the actual value of the armature current furnished by the current transformer 10 a difference value which is fed as the input to the current controller 8. The latter generates a controlled variable which influences the armature current by means of the thyristor rectifier 3 in the sense of holding the motor speed n constant. This arrangement is generally known.

In order to influence, according to the present invention, the speed correction so as to maintain instead a constant motor power, a desired power value P* is first preselected at scale 21 of a potentiometer 22. The latter is fed to a further controller 23 which corrects the preselected desired power value, for example, on the basis of a temperature sensor 24. To form the actual power quantity, the value of the quantity determined by the current transformer 13 for the field current $i_F$ is fed to device 12 as an input in order to determine the value of the field strength $\phi$. The latter is fed, together with the actual value for the armature current $i_{Aist}$ from current transformer 10, to the multiplier 11. Multiplier 11 forms from these input quantities a value which corresponds to the actual value of the motor torque m and which is then multiplied in the multiplier 14 by the value for the actual speed of the motor furnished by tachometer generator 9, so that a value corresponding to the actual power $P_{ist}$ of the motor is produced. The latter is compared in the power controller 15 with the corrected value for the desired power P* of the motor from controller 23 and a control signal X is formed by controller 15 which is fed to the current controller 8 in order to keep the motor power constant. A switch 25 is provided for deactivating controller 15. When switch 25 is open, the control arrangement illustrated operates as a conventional rolling mill driving motor controller which maintains a constant speed of the driving motor. When switch 25 is closed, however, controller 15 is activated, thus supplying control signal X to current controller 8, and the driving motor thereafter delivers constant power. The use of switch 25 therefore allows the control arrangement to be used in applications requiring either constant speed or constant power, depending on the materials being rolled.

It is achieved in this manner that the respective speed and the torque are automatically corrected in dependence on the conditions of the material being rolled.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than a restrictive sense.

What is claimed is:

1. In an electrical control arrangement for controlling the speed of a rolling mill driving motor having an armature winding and a field winding supplied with electrical current from a supply network, the driving motor being coupled to and driving rolls of a rolling mill for manufacturing hollow blocks, the control arrangement including a speed controller for controlling the speed of the motor, a current controller for controlling the armature winding current coupled to the speed controller, means coupled to said driving motor for determining the actual speed of the motor and means coupled to said armature winding for determining the armature winding current of the motor, said speed controller being coupled to means for generating a reference speed value and said means for determining the actual speed of the motor whereby said speed controller generates a signal proportional to a desired value of the armature winding current, said signal being supplied to said current controller, the improvement comprising:

first means coupled to the field winding for determining the field strength generated by said field winding of the motor;

second means for generating a reference motor power value;

control means comprising first multiplier means coupled to said means for determining the armature winding current and to said first means, for generating, at an output thereof, a signal proportional to the torque developed by said driving motor, second multiplier means coupled to said means for determining the actual speed of the motor and to the output of said first multiplier means, for developing, at an output thereof, a signal proportional to the actual power developed by said motor, and third means coupled to said second means and to the output of said second multiplier means for comparing the actual value of the motor power with said reference power value to form a control signal, said control signal coupled as a control input to said current controller whereby said current controller maintains the power of said motor substantially constant, and means for selectively deactivating said control means whereby said control arrangement maintains the speed of the driving motor substantially constant, instead of maintaining the power of said motor substantially constant.

2. The improvement recited in claim 1, wherein said second means further comprises reference value setting means coupled to said control means for setting said reference power value as a function of the type of material to be rolled.

3. The improvement recited is claim 1 wherein said first means further comprises means for determining the field winding current of the motor.

4. In an electrical control arrangement for controlling the speed of a rolling mill driving motor having an armature winding and a field winding supplied with electrical current from a supply network, the driving motor being coupled to and driving the rolls of a rolling mill for manufacturing hollow blocks, the control arrangement including a speed controller for controlling the speed of the motor, a current controller for controlling the armature winding current coupled to the speed controller, means coupled to said driving motor for determining the actual speed of the motor and means coupled to said armature winding for determining the armature winding current of the motor, said speed controller being coupled to means for generating a reference speed value and said means for determining the actual speed of the motor whereby said speed controller generates a signal proportional to a desired value of the armature winding current, said signal being supplied to said current controller, the improvement comprising:

first means coupled to the field winding for determining the field strength generated by said field winding of the motor;

second means for generating a reference motor power value including reference value setting means coupled to said control means for setting said reference power value as a function of the type of material to be rolled;

control means coupled to said first means, to said means for determining the armature winding current, to said means for determining the actual speed of the motor and to said second means, for determining the actual value of the motor power and for comparing the actual value of the motor power with said reference power value to form a control signal, said control signal coupled as a control input to said current controller whereby said current controller maintains the power of said motor substantially constant and means for selectively deactivating said control means whereby said control arrangement maintains the speed of the driving motor substantially constant, instead of maintaining the power of said motor substantially constant.

5. The improvement recited in claim 4 wherein said first means further comprises means for determining the field winding current of the motor.

* * * * *